United States Patent
Chen et al.

(10) Patent No.: US 8,376,555 B2
(45) Date of Patent: Feb. 19, 2013

(54) PROJECTOR AND LENS COLLAR MODULE THEREOF

(75) Inventors: Chia-Tien Chen, Hsin-Chu (TW); Li-Pin Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 284 days.

(21) Appl. No.: 12/876,241

(22) Filed: Sep. 7, 2010

(65) Prior Publication Data
US 2011/0109885 A1 May 12, 2011

(30) Foreign Application Priority Data
Nov. 10, 2009 (CN) .......................... 2009 1 0212109

(51) Int. Cl.
- G03B 21/14 (2006.01)
- G03B 3/00 (2006.01)
- G03B 17/00 (2006.01)
- G03B 1/48 (2006.01)
- G02B 7/02 (2006.01)
- G02B 27/02 (2006.01)

(52) U.S. Cl. ........ 353/101; 353/122; 396/144; 396/529; 359/805; 359/819; 352/231

(58) Field of Classification Search .................. 353/101, 353/100, 122; 396/529, 144; 359/811, 819, 359/805; 352/231
See application file for complete search history.

(56) References Cited

U.S. PATENT DOCUMENTS
| | | | |
|---|---|---|---|
| 6,545,825 B2 * | 4/2003 | Shoji et al. | 359/819 |
| 6,942,349 B2 * | 9/2005 | Inamoto | 353/97 |
| 7,061,699 B2 * | 6/2006 | Watanabe et al. | 359/819 |
| 7,530,747 B2 * | 5/2009 | Wang et al. | 396/529 |

FOREIGN PATENT DOCUMENTS
TW  I304300  12/2008

OTHER PUBLICATIONS
Web site; http://www.diytrade.com/china/2/products/311248/TW-1101_型豪华验光架 .html, published on Mar. 21, 2003.
Web site; http://www.66aiyan.com/upfile/20071072337964971.jpg. , retrieved on Aug. 26, 2010.

* cited by examiner

*Primary Examiner* — Georgia Y Epps
*Assistant Examiner* — Magda Cruz
(74) *Attorney, Agent, or Firm* — Jianq Chyun IP Office

(57) ABSTRACT

A projector includes a casing, a light source disposed in the casing and capable of providing an illumination beam, a light valve disposed in the casing and capable of converting the illumination beam into an image beam, a lens disposed in the casing and adapted to project the image beam, and the lens collar module. The lens collar module includes a fitting part and a lens collar. The fitting part is formed on the casing, and has a fitting opening and a first bump. The lens collar has a fitting periphery and a second bump. The fitting periphery is fitted to the fitting opening, the lens collar is adapted to be rotated and translated relative to the casing along an axial direction. Engagement of the first bump and the second bump limits rotation and translation of the lens collar relative to the casing along the axial direction.

6 Claims, 6 Drawing Sheets

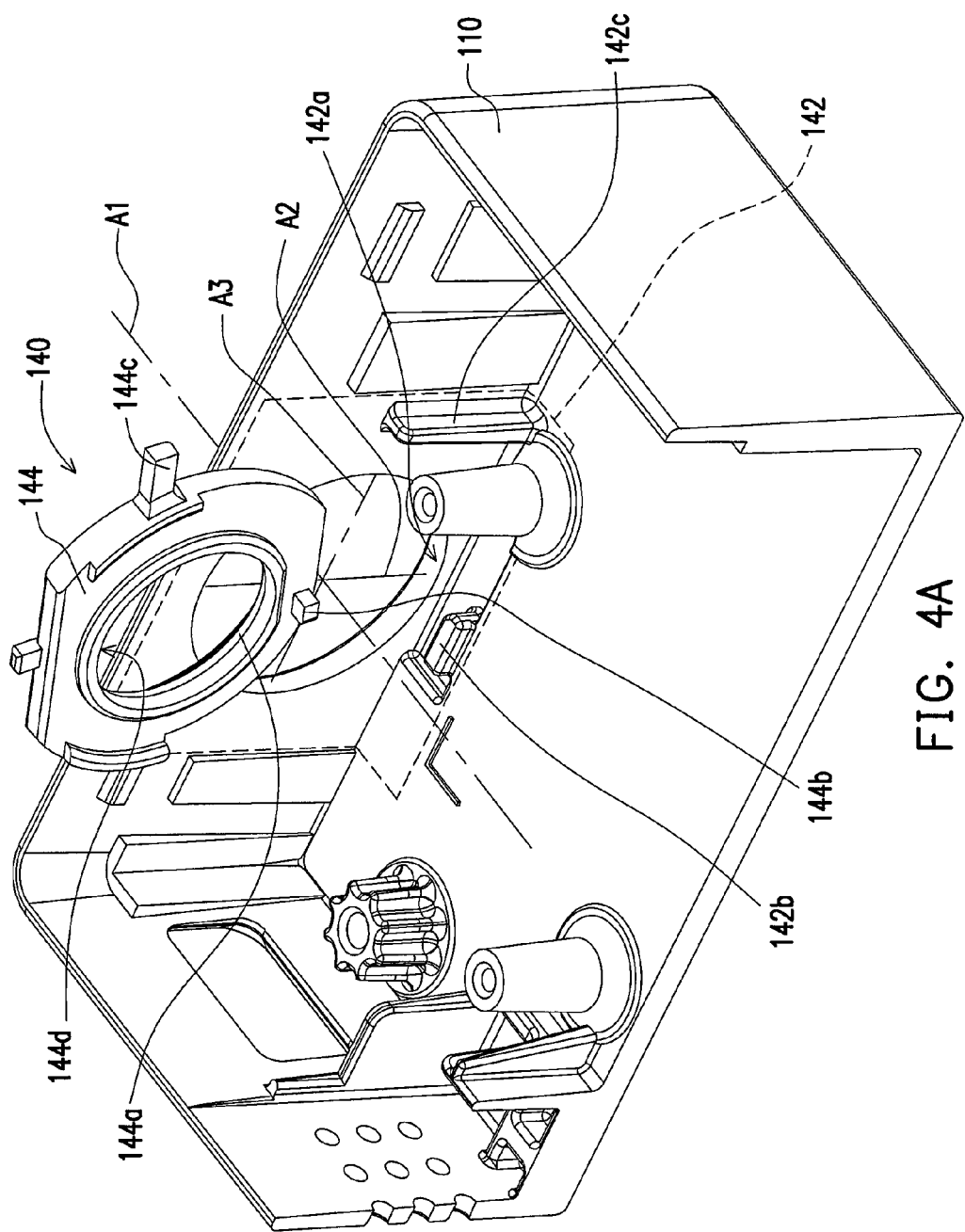

PROJECTOR AND LENS COLLAR MODULE THEREOF

CROSS-REFERENCE TO RELATED APPLICATION

This application claims the priority benefit of China application serial no. 200910212109.0, filed on Nov. 10, 2009. The entirety of the above-mentioned patent application is hereby incorporated by reference herein and made a part of this specification.

BACKGROUND OF THE INVENTION

1. Field of the Invention

The invention relates to a display apparatus and a lens collar module thereof. More particularly, the invention relates to a projector and a lens collar module thereof.

2. Description of Related Art

A projector is a display apparatus used for producing large size images. An imaging principle of the projector is to convert a light beam generated by a light source module into an image beam through a light valve, and then the image beam may be projected onto a screen or a wall through a lens. With development of the projection technique and reduction of the fabrication cost, utilization of the projector is gradually developed from commercial use to domestic use.

The projector generally has a lens collar used for shielding a gap between the lens and a casing of the projector and also used for decorating. The aforementioned image beam may be projected outside the projector through the lens collar. The lens collar may be assembled to the projector by adhesion, though such assembling method results in a fact that the lens is hard to be disassembled from the casing of the projector, and may not be independently replaced. If the lens is assembled to the projector through a screwing approach, the lens may be easily disassembled. However, a relatively large internal space of the projector is required to accomplish the assembling through the screwing approach. A Taiwan patent No. 1304300 discloses an assembling approach of engaging a lens to a camera.

SUMMARY OF THE INVENTION

The invention is directed to a projector, a lens collar of the projector may be easily disassembled, and a configuration space of the projector is saved.

The invention is directed to a lens collar module, a lens collar of the collar module may be easily disassembled, and a configuration space of the collar module is saved.

Other objects and advantages of the invention may be further illustrated by the technical features broadly embodied and described as follows.

In order to achieve at least one of the objectives or other objectives, the embodiment of the invention provides a lens collar module adapted to be assembled to a casing of a projector. The lens collar module includes a fitting part and a lens collar. The fitting part is formed on the casing, and has a fitting opening and a first bump. The lens collar has a fitting periphery and a second bump. The fitting periphery is fitted to the fitting opening, and the lens collar is adapted to be rotated and translated relative to the casing along an axial direction. Engagement of the first bump and the second bump limits rotation and translation of the lens collar relative to the casing along the axial direction.

In order to achieve at least one of the objectives or other objectives, the embodiment of the invention provides a projector including a casing, a light source, a light valve, a lens, and a lens collar module. The light source is disposed in the casing, and is capable of providing an illumination beam. The light valve is disposed in the casing, and is capable of converting the illumination beam into an image beam. The lens is disposed in the casing, and is adapted to project the image beam to outside of the casing to form an image. The lens collar module includes a fitting part and a lens collar. The fitting part is formed on the casing, and has a fitting opening and a first bump. The lens collar has a fitting periphery and a second bump. The fitting periphery is fitted to the fitting opening, and the lens collar is adapted to be rotated and translated relative to the casing along an axial direction. Engagement of the first bump and the second bump limits rotation and translation of the lens collar relative to the casing along the axial direction.

In summary, the embodiment or the embodiments of the invention may have at least one of the following advantages:

In the projector and the lens collar module of the embodiments of the invention, the lens collar is fitted to the fitting part formed on the casing of the projector, and the bump of the fitting part is engaged with the bump of the lens collar to fix the lens collar. A user may rotate the lens collar to release the engagement between the two bumps, so as to disassemble the lens collar, and a convenience of disassembling the lens collar is improved. Moreover, compared to the conventional technique that the lens collar is assembled through a screwing approach, the assembling method of the projector and the lens collar module of the embodiment of the invention requires relatively small space, and an internal configuration space of the projector is saved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 4A-4C are diagrams illustrating an assembling flow of a lens collar module of FIG. 1.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
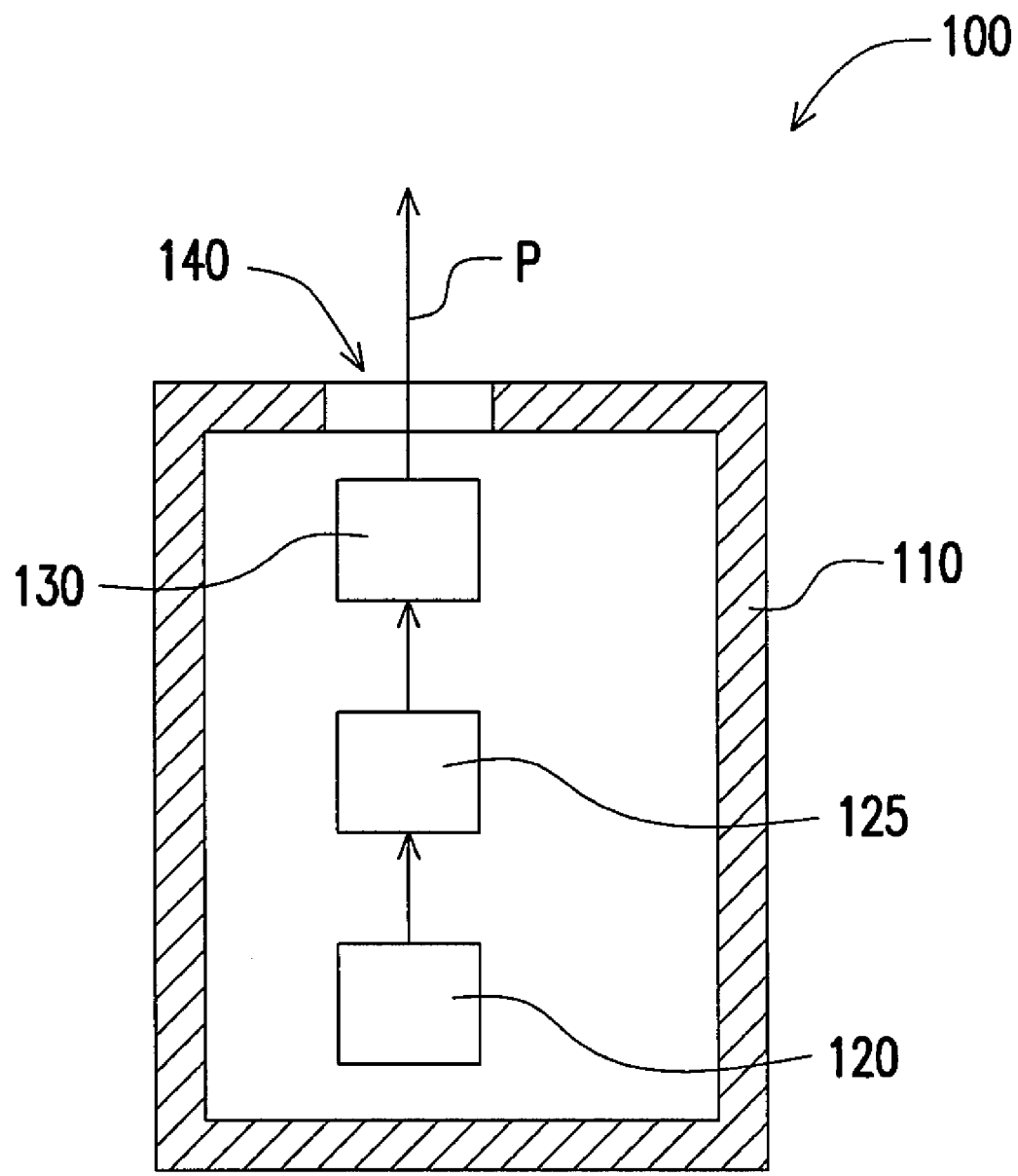
FIG. 1 is a schematic diagram illustrating a projector according to an embodiment of the invention.

Referring to FIG. 1, the projector 100 of the embodiment includes a casing 110, a light source 120, a light valve 125, a lens 130, and a lens collar module 140. The light source 120 is disposed in the casing 110, and is capable of providing an illumination beam. The light valve 125 is disposed in the casing 110, and is capable of converting the illumination beam into an image beam. The lens 130 is disposed in the casing 110 and located in a transmission path P of the image beam, and is adapted to project the image beam to outside of the casing 110 to form an image.

Figure 2:
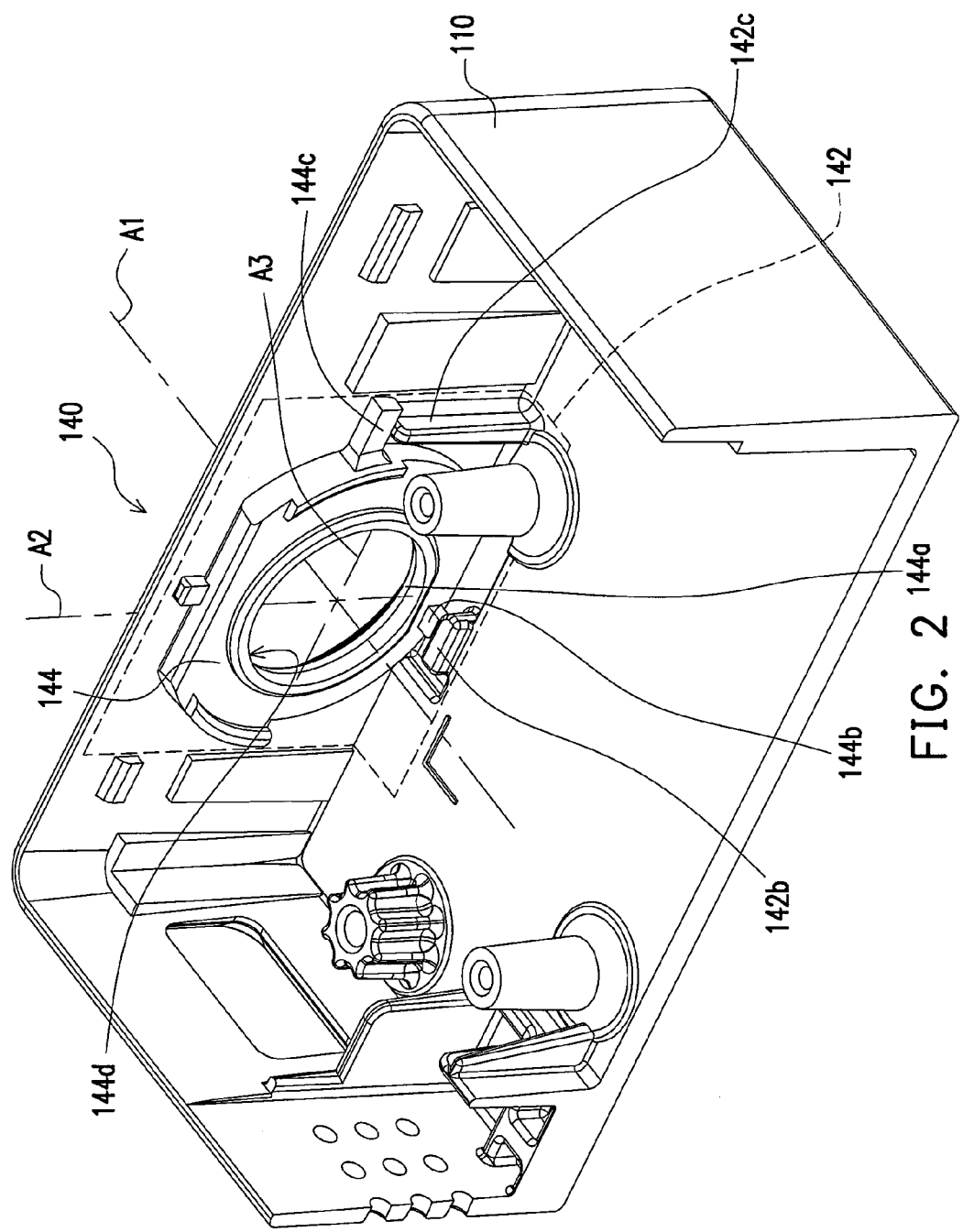
FIG. 2 is a partial perspective view of a projector of FIG. 1.
Figure 3:
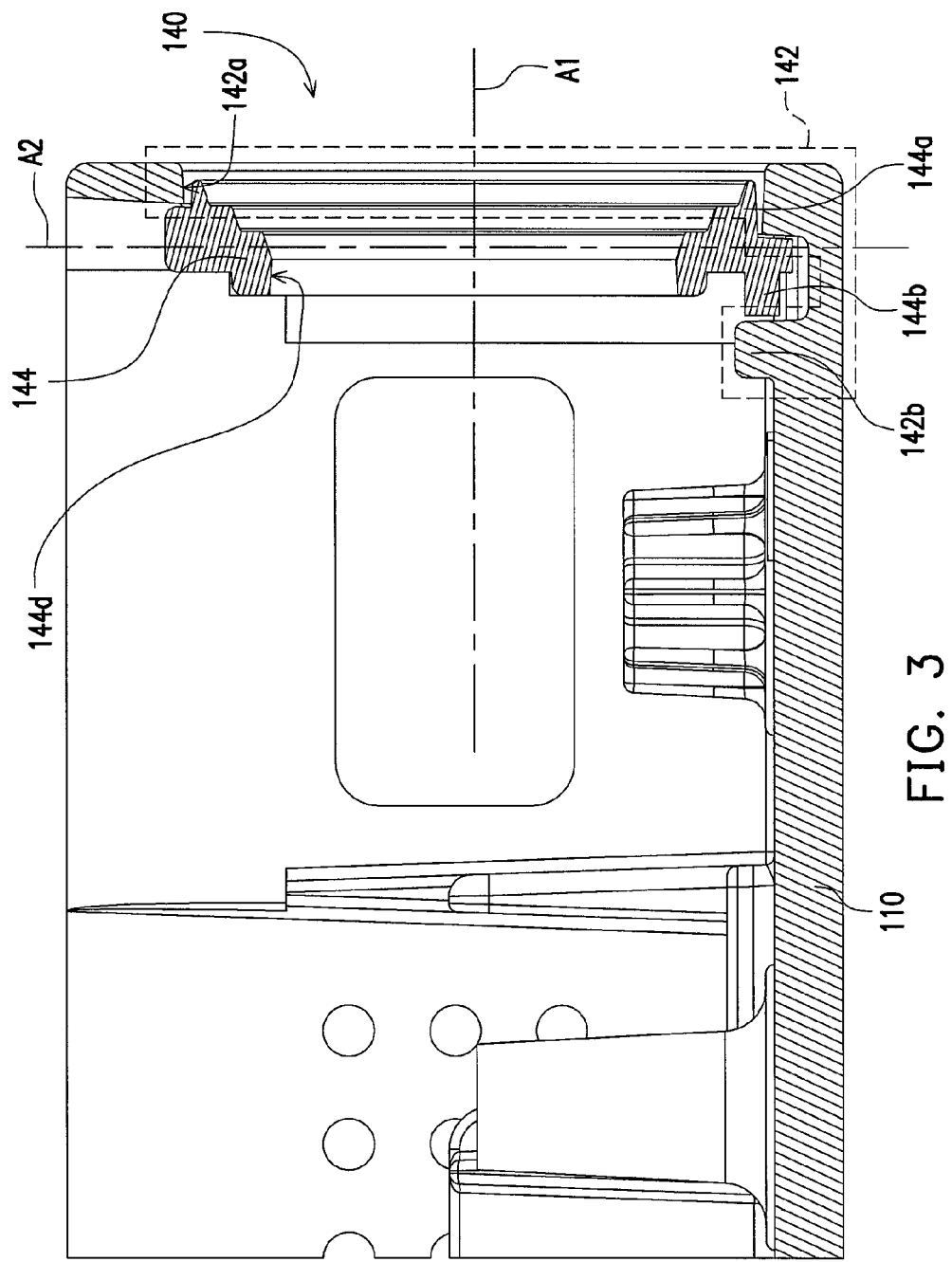
FIG. 3 is a partial cross-sectional view of a projector of FIG. 1.

Referring to FIG. 2 and FIG. 3, the lens collar module 140 includes a fitting part 142 and a lens collar 144. The fitting part 142 is formed on the casing 110, and has a fitting opening 142a and a first bump 142b. The lens collar 144 has a fitting periphery 144a and a second bump 144b. The fitting periphery 144a is fitted to the fitting opening 142a, and the lens collar 144 is adapted to be rotated and translated relative to the casing 110 along an axial direction A1. Engagement of the first bump 142b and the second bump 144b limits the rotation and translation of the lens collar 144 relative to the casing 110 along the axial direction A1.

In detail, fitting of the fitting periphery 144a and the fitting opening 142a limits rotation and translation of the lens collar 144 relative to the casing 110 along axial directions A2 and A3 (the axial direction A2 is substantially perpendicular to the axial direction A3), and the engagement of the first bump 142b and the second bump 144b limits rotation and translation of the lens collar 144 relative to the casing 110 along the axial direction A1 (the axial direction A1 is substantially perpendicular to the axial directions A2 and A3). In this way, the lens collar 144 is fixed to the casing 110, and rotation and translation of the lens collar 144 relative to the casing 110 are avoided. Compared to the conventional technique that the lens collar is assembled through a screwing approach, the assembling method of the embodiment requires relatively smaller space, and an internal configuration space of the projector 100 is saved.

Referring to FIG. 2, the lens collar 144 of the embodiment further has a third bump 144c, and the fitting part 142 further has a block part 142c. The third bump 144c leans against the block part 142c for limiting a rotation range of the lens collar 144 relative to the casing 110 along the axial direction A1. In other words, in the lens collar module 140, besides the engagement of the first bump 142b and the second bump 144b limits the rotation of the lens collar 144 relative to the casing 110 along the axial direction A1, and a structural interference between the third bump 144c and the block part 142c may also limit rotation of the lens collar 144 relative to the casing 110 along the axial direction A1 due to excessive force applied thereon during the assembling.

Moreover, referring to FIG. 2 and FIG. 3, the lens collar 144 of the embodiment has a light transmittance opening 144d, and the fitting periphery 144a surrounds the light transmittance opening 144d. The lens 130 of FIG. 1 may project the image beam provided by the light source 120 to outside of the casing 110 through the light transmittance opening 144d to form an image.

The assembling method of the lens collar module 140 of the embodiment is described below with reference of FIG. 2 and FIGS. 4A-4C. First, referring to FIG. 4A, the lens collar 144 is moved along the axial direction A2 to a position shown in FIG. 4B, and the fitting periphery 144a is corresponded to the fitting opening 142a. Then, referring to FIG. 4B, the lens collar 144 is moved along the axial direction A1 to a position shown in FIG. 4C, and the fitting periphery 144a is fitted to the fitting opening 142a.

Figure 4B:
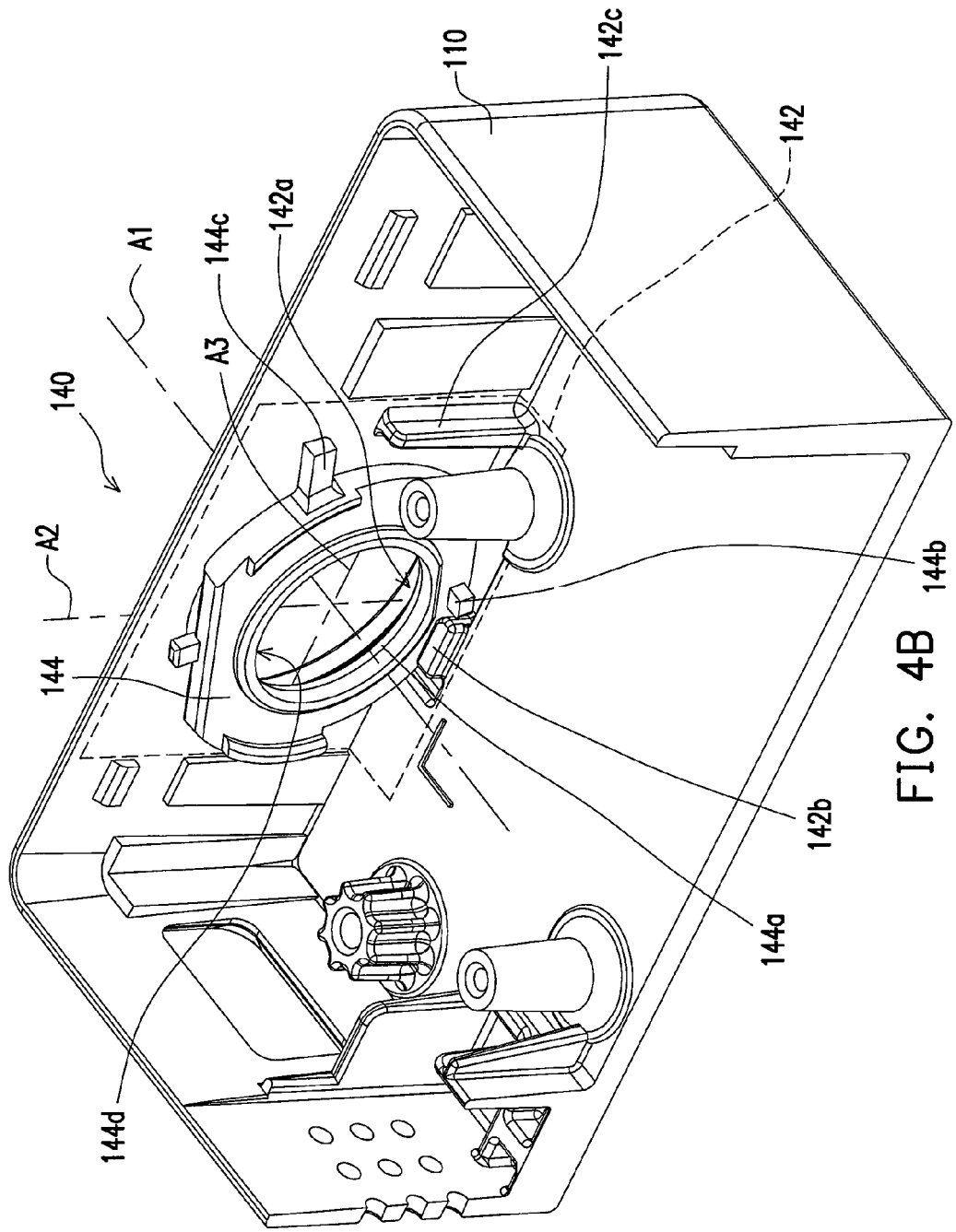
Figure 4C:
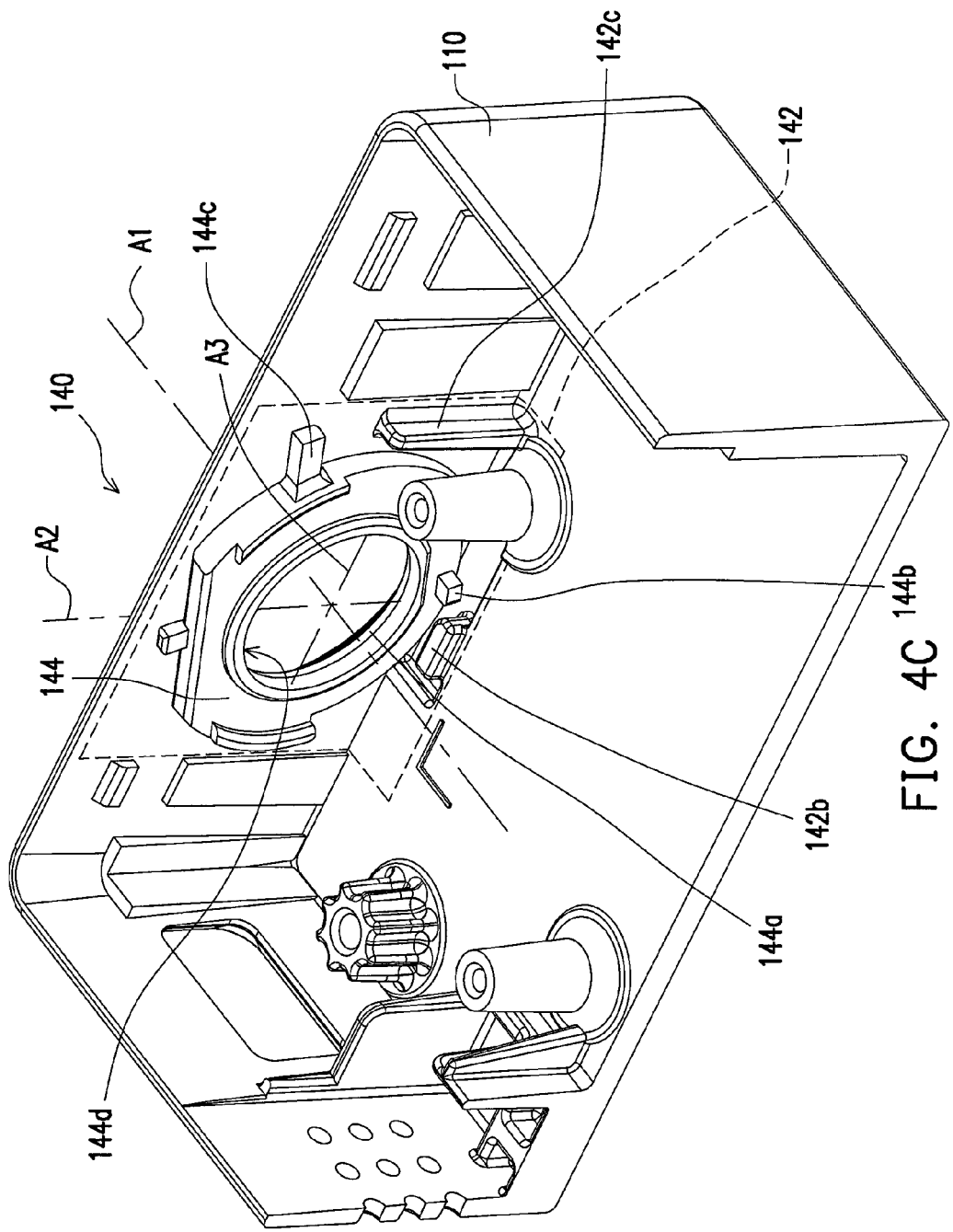

Then, referring to FIG. 4C, the lens collar 144 is rotated along the axial direction A1 to a position shown in FIG. 2, the first bump 142b is engaged with the second bump 144b, and the third bump 144c is leaned against the block part 142c. Therefore, the lens collar 144 is fixed on the casing 110 through the engagement of the first bump 142b and the second bump 144b, and the structural interference between the third bump 144c and the block part 142c.

In summary, the embodiment or the embodiments of the invention may have at least one of the following advantages:

The lens collar is fitted to the fitting part formed on the casing of the projector, and the bump of the fitting part is engaged with the bump of the lens collar to fix the lens collar. A user may rotate the lens collar to release the engagement between the two bumps, so as to disassemble the lens collar, and a convenience of disassembling the lens collar is improved. Compared to the conventional technique that the lens collar is assembled through a screwing approach, the assembling method of the embodiment of the invention requires relatively small space, and an internal configuration space of the projector is saved.

Moreover, the lens collar and the fitting part respectively have the third bump and the block part, and a structural interference between the third bump and the block part may further limit rotation of the lens collar relative to the casing. Therefore, the lens collar may be stably assembled on the casing.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens collar module, adapted to be assembled to a casing of a projector, comprising:
   a fitting part adapted to be formed on the casing, and having a fitting opening and a first bump;
   a lens collar having a fitting periphery and a second bump, wherein the fitting periphery is fitted to the fitting opening, the lens collar is adapted to be rotated and translated relative to the casing along an axial direction, and wherein the first bump of the fitting part engages with the second bump of the lens collar to limit rotation and translation of the lens collar relative to the casing along the axial direction.

2. The lens collar module as claimed in claim 1, wherein the lens collar further has a third bump, and the fitting part further has a block part, wherein the third bump leans against the block part for limiting a rotation range of the lens collar relative to the casing along the axial direction.

3. The lens collar module as claimed in claim 1, wherein the lens collar has a light transmittance opening, and the fitting periphery surrounds the light transmittance opening.

4. A projector, comprising:
   a casing;
   a light source disposed in the casing, and capable of providing an illumination beam;
   a light valve disposed in the casing, and capable of converting the illumination beam into an image beam;
   a lens disposed in the casing, and adapted to project the image beam to outside of the casing to form an image; and
   a lens collar module, comprising:
      a fitting part formed on the casing, and having a fitting opening and a first bump; and
      a lens collar having a fitting periphery and a second bump, wherein the fitting periphery is fitted to the fitting opening, the lens collar is adapted to be rotated and translated relative to the casing along an axial direction, and wherein the first bump of the fitting part engages with the second bump of the lens collar to limit rotation and translation of the lens collar relative to the casing along the axial direction.

5. The projector as claimed in claim 4, wherein the lens collar further has a third bump, and the fitting part further has a block part, wherein the third bump leans against the block part for limiting a rotation range of the lens collar relative to the casing along the axial direction.

6. The projector as claimed in claim 4, wherein the lens collar has a light transmittance opening, and the fitting periphery surrounds the light transmittance opening.

* * * * *